United States Patent [19]
Kerz

[11] Patent Number: 5,425,112
[45] Date of Patent: Jun. 13, 1995

[54] METHOD FOR OPTIMIZING FREQUENCY-MODULATED RASTERS UPON UTILIZATION OF THRESHOLD HILLS

[75] Inventor: Ludo Kerz, Saulheim, Germany

[73] Assignee: Linotype-Hell, Kiel, Germany

[21] Appl. No.: 174,897

[22] Filed: Dec. 28, 1993

[30] Foreign Application Priority Data

Apr. 8, 1993 [DE] Germany .................. 43 11 575.6
Nov. 12, 1993 [DE] Germany .................. 93118320 U

[51] Int. Cl.⁶ .............................................. G06K 9/00
[52] U.S. Cl. ...................................... 382/270; 358/466
[58] Field of Search .................... 382/50, 53; 358/462, 358/465, 466, 455

[56] References Cited

U.S. PATENT DOCUMENTS

| | | | |
|---|---|---|---|
| 4,150,428 | 9/1992 | Leone et al. | 382/50 |
| 4,998,122 | 3/1991 | Kanno et al. | 382/50 |
| 5,150,429 | 9/1992 | Miller et al. | 382/50 |

*Primary Examiner*—Leo H. Boudreau
*Attorney, Agent, or Firm*—Hill, Steadman & Simpson

[57] ABSTRACT

The method optimizes frequency-modulated rasters for recording black-and-white or chromatic raster images. An image to be recorded is optoelectronically scanned and is digitally stored in the form of the individual gray scale values that were allocated to the individual pixels. Threshold decisions are implemented using the gray scale values, a decision being made as to whether or not a pixel is set in the rastered recording of the image.

20 Claims, 15 Drawing Sheets

| 143 | 61 | 215 | 31 | 93 |
|-----|-----|-----|-----|-----|
| 204 | 11 | 1 | 255 | 133 |
| 174 | 194 | 133 | 82 | 164 |
| 21 | 41 | 72 | 225 | 51 |
| 153 | 245 | 184 | 123 | 235 |

| | 4 | 32 | | 24 | | 40 | | | 18 | 34 | | 42 | | | |
|---|---|---|---|---|---|---|---|---|---|---|---|---|---|---|---|
| | | | | | | | | | | | | | | | 10 |
| | | 16 | | | | 8 | | | | | 2 | | 26 | | |
| | 48 | | | | 56 | | | 50 | | | | | | 58 | |
| | | | | | 36 | 20 | | | | | | 6 | | | 38 |
| 28 | | 44 | | | | | | 30 | | | 46 | | | | |
| | 60 | 12 | | 0 | | | 52 | | | | 14 | | | | |
| | | | | | | | | 62 | | | | 54 | | 22 | |
| | 19 | | 35 | | 43 | | | | | | 17 | | | | |
| | | | | | | 27 | | 33 | | | | 9 | | 41 | |
| 51 | | | | | 7 | 59 | | 1 | | | 49 | | | | 25 |
| | | | 11 | | | | | | | | | 57 | | | |
| | 47 | 3 | | | | | 23 | | 45 | | | | | | 5 |
| | | | | 39 | | | | | | | 29 | 37 | | | |
| | | 63 | | | 15 | | | | | 61 | | | 21 | | |
| 31 | | | | | | | 55 | | 13 | | | | | | 53 |

Fig. 17

| 64  | 4   | 32  | 159 | 24  | 215 | 40  | 151 | 189 | 18  | 34  | 237 | 42  | 213 | 253 | 149 |
|-----|-----|-----|-----|-----|-----|-----|-----|-----|-----|-----|-----|-----|-----|-----|-----|
| 191 | 239 | 223 | 96  | 183 | 72  | 104 | 255 | 66  | 221 | 157 | 98  | 74  | 181 | 10  | 106 |
| 143 | 112 | 16  | 247 | 120 | 135 | 8   | 88  | 141 | 114 | 205 | 2   | 229 | 26  | 197 | 165 |
| 207 | 48  | 175 | 80  | 231 | 56  | 167 | 199 | 50  | 245 | 82  | 173 | 133 | 122 | 58  | 90  |
| 179 | 251 | 108 | 211 | 219 | 36  | 20  | 100 | 209 | 78  | 225 | 145 | 6   | 70  | 233 | 38  |
| 28  | 76  | 44  | 147 | 68  | 187 | 243 | 155 | 30  | 177 | 110 | 46  | 185 | 217 | 153 | 102 |
| 195 | 60  | 12  | 227 | 0   | 116 | 171 | 52  | 126 | 129 | 94  | 14  | 137 | 118 | 201 | 86  |
| 131 | 124 | 163 | 97  | 139 | 235 | 203 | 84  | 62  | 249 | 193 | 161 | 54  | 241 | 22  | 169 |
| 220 | 19  | 99  | 35  | 180 | 43  | 148 | 228 | 65  | 222 | 158 | 17  | 230 | 182 | 214 | 105 |
| 188 | 67  | 156 | 236 | 75  | 212 | 107 | 27  | 190 | 33  | 254 | 97  | 9   | 73  | 41  | 150 |
| 51  | 140 | 83  | 204 | 204 | 7   | 59  | 164 | 1   | 142 | 174 | 49  | 121 | 134 | 166 | 25  |
| 252 | 115 | 172 | 11  | 132 | 123 | 91  | 196 | 238 | 113 | 206 | 81  | 57  | 198 | 246 | 89  |
| 79  | 47  | 3   | 224 | 216 | 184 | 103 | 23  | 178 | 45  | 210 | 109 | 69  | 186 | 101 | 5   |
| 208 | 176 | 144 | 111 | 39  | 71  | 248 | 152 | 77  | 242 | 146 | 29  | 37  | 218 | 154 | 234 |
| 240 | 128 | 63  | 160 | 119 | 15  | 168 | 200 | 130 | 194 | 61  | 226 | 117 | 21  | 202 | 170 |
| 31  | 127 | 192 | 95  | 232 | 136 | 87  | 55  | 125 | 13  | 162 | 93  | 250 | 138 | 85  | 53  |

Fig. 18

METHOD FOR OPTIMIZING FREQUENCY-MODULATED RASTERS UPON UTILIZATION OF THRESHOLD HILLS

BACKGROUND OF THE INVENTION

The present invention is in the field of electronic reproduction technology and is directed to a method for optimizing frequency-modulated rasters using threshold hills.

Different half-tone values (gray scale values) of an image to be reproduced can be produced in the print only on the basis of a surface modulation in that the gray scale values are resolved into highly resolved binary values having only two brightness values (black and white).

In autotype rastering (dot screening), the surface modulation ensues in that the gray scale values of the image are converted into picture elements of different sizes and are printed, whereby the picture elements are arranged in a regular raster structure having periodically repeating raster meshes. In order to minimize disturbing Moire patterns, the dot rasters of the individual inks are arranged at different screen angles.

German reference 2,827,596 discloses an autotype rastering method for generating dot rasters having arbitrary screen angling using a threshold hill. In this rastering method, a matrix is subdivided into a plurality of matrix elements and a threshold is allocated to every matrix element. The totality of thresholds, referred to as a threshold hill or raster hill, represents the repeating basic structure for every raster mesh of the dot raster.

The recording material for the rastered image is divided into a plurality of surface elements. When recording the rastered image in an output device (recorder), the picture elements in the individual raster meshes of the dot raster grid are composed of exposed surface elements (illumination pixels; device pixels). The check to determine whether or not a device pixel is to be illuminated or exposed as part of a picture element ensues on the basis of a comparison of the corresponding gray scale values of the image to the thresholds of the threshold hill. The results of the comparison are retained as bits in what is referred to as a bit map wherein every set bit corresponds to an exposed surface element or device pixel (or vice versa in the case of a negative presentation). The bit map generally has the size of the recording surface. The control of the exposure beam in the recorder ensues with reference to the bit map.

FIG. 1 shows an example of a threshold hill for an autotype rastering. In this example a two-dimensional threshold matrix 1 has 5×5 matrix elements 2 that are filled with the thresholds 1 through 255, namely for that case wherein the individual gray scale values of the image are represented by numbers between 0 and 255, whereby the number 0 corresponds to "black" and the number 255 corresponds to "white". The threshold matrix 1 generally has the size of a raster mesh of the dot raster. In order, for example, to produce the gray scale value 192 (25% surface coverage), a check is carried out for every matrix element 2 within the threshold matrix 1 to determine if the gray scale value 192 is lower than the threshold allocated to the matrix element 2. When this is the case, the appertaining bit is set in the bit map and the corresponding device pixel is blackened; otherwise, the corresponding bit is not set.

FIG. 2 shows a pixel within a raster mesh 3, said pixel having been produced according to an autotype rastering method. The pixel is composed of seven exposed device pixels 4 of 25 possible device pixels 4 within a raster mesh 3 and thus represents a surface coverage of approximately 25% or, respectively, the gray scale value 192. Typically, the thresholds are assigned such that the set bits in the bit map or the exposed device pixels form a continuous, growing, black area (pixel, printing dot) given an increasing gray scale value.

Since the threshold matrix 1 for the threshold hill is noticeably smaller than the bit map, the allocation of the bits of the bit map to the thresholds of the threshold matrix 1 is continuously repeated in the x-direction and in the y-direction of the bit map, this being shown in FIG. 3.

FIG. 3 shows the periodic allocation of the thresholds of the raster meshes 3 or of the individual raster meshes 3 of a dot raster to a bit map 5. A few pixels 6 having a surface coverage of 25% are indicated in the raster meshes 3 respectively composed of 25×25 device pixels 4. Since the allocation of the threshold matrix 1 in the x-direction and the y-direction is continuously repeated, this leads to the formation of a grid structure.

Alternatively to autotype rastering, the surface modulation of the inks can also ensue according to a method for frequency-modulated rastering, for example according to the method set forth in the German reference 2,931,098. In frequency-modulated rastering, the gray scale values of the image are reproduced by an arrangement of small printing dots (device pixels) of the same size that are more or less arbitrarily selected in the recording surface. The plurality of device pixels per surface unit defines the gray scale value that is reproduced.

Various methods, for example error diffusion, ordered dither, etc., are known for frequency-modulated rastering. All methods are based thereon that the status of the neighboring pixel is taken into consideration with a certain weighting in the decision as to whether or not a device pixel is to be set. Further, an error propagation from one device pixel to the next is also undertaken, i.e. the status of the most recently set device pixel has influence on the next pixel to be processed.

FIG. 4 shows an example of a frequency-modulated rastering. The set bits or the corresponding device pixels 4 are more or less arbitrarily distributed within the surface unit in the bit map 5 and thus no longer form a continuous area. A surface coverage of 25% is shown.

The advantage of an autotype rastering method with a threshold hill is based on the rastering being carried out very quickly both in software as well as in hardware. In traditional, frequency-modulated rastering methods, a plurality of time-consuming calculation operations are required for every device pixel. This has a disadvantageous effect on the operating speed.

It is also known to combine an autotype rastering method and a frequency-modulated rastering method with one another and to fill a threshold hill with an arbitrary sequence of thresholds that do not form a contiguous area. To this end, FIG. 5 shows a threshold matrix 1 having a random sequence of 5×5 thresholds for the frequency-modulated rastering and FIG. 6 shows a pixel of seven randomly distributed, exposed device pixels 4 within a surface unit 7 that is produced by a frequency-modulated rastering. This procedure, however, has the disadvantage that disturbing residual structures result in color areas having constant tonal value even given the most dexterous selection of the random distribution of the thresholds. Since the threshold hill periodically repeats in the x-direction and in the y-direction, these residual structures are also repeated over the entire recording surface. Since the eye is especially sensitive to such residual structures, they are not tolerable in practice.

SUMMARY OF THE INVENTION

It is an object of the present invention to provide a method for optimizing frequency-modulated rastering for recording rastered images with which the creation of disturbing structures in the recording surface due to the periodic repetition of a threshold hill is avoided to the farthest-reaching extent and structures in the threshold hill itself are minimized.

In general terms the present invention is a method for optimizing frequency-modulated rasters for the recording of (black-and-white or chromatic) raster images. The image to be respectively recorded is optoelectronically scanned pixel-by-pixel and is digitally stored in a pixel memory in the form of gray scale values allocated to the individual pixels. Threshold decisions are implemented on the basis of the gray scale values, a decision being made with reference to these threshold decisions as to whether a pixel is or is not set in the recording of the image. A two-dimensional threshold memory is employed for threshold decision. This is superimposed on the pixel memory in two-dimensional periodic repetition for the implementation of the threshold decisions. The thresholds thereof are selected such that they form a topography, i.e. one or more threshold hills within the threshold memory (in a third dimension). The expanse of the threshold memory is selected larger in one dimension than in the other dimension. An offset is employed in one dimension of the repetition in the two-dimensional periodic repetition of the threshold memory. The threshold memory is subdivided into sub-memories that together form the overall threshold memory. The filling of the sub-memories with thresholds ensues by random selection of the thresholds of the threshold hill, by continuous quadranting of the thresholds, and by random distribution of the values within the sub-memories.

Advantageous developments of the present invention are as follows.

The method can be carried out with a variable offset that is defined by a random number that is constantly re-defined, or with a constant offset.

The sub-memories are fashioned as sub-quadrants that are formed of elements arranged in rows. The filling of the elements of the sub-quadrants ensues by continuous quadranting of the threshold hill and by random determination of the elements in the sub-quadrants.

The first element of a row is sought from the threshold hill with a random generator and the number zero is allocated to it. The threshold hill is subdivided into four quadrants of the first order and the second element of the row is determined in that quadrant of the first order which lies opposite the quadrant of the first order wherein the first element is located and the ordinal number one is allocated to the second element. One proceeds such with the assigning of the ordinal numbers two and three in the two remaining quadrants of the first order, as in the case of the two first quadrants of the first order. The four quadrants of the first order are subdivided into four groups of four quadrants of the second order, whereby the four ordinal numbers that are assigned each respectively fall into one respective quadrant of the second order within one of the four groups. The ordinal numbers four through seven are respectively assigned to one group of four quadrants within the quadrants of the second order, whereby the ordinal number four is allocated to that quadrant that lies opposite the quadrant that already contains one of the ordinal numbers one through three. In two further passes, respectively one quadrant of each group is occupied with a further ordinal number until all quadrants of the second order are occupied with an ordinal number. Four groups of quadrants of the third order are successively formed, whereby one of the four groups is formed first and four further ordinal numbers are assigned, a second group lying diagonally relative to the first group is formed, this being likewise occupied with four ordinal numbers, and, subsequently, a third group and fourth group are formed that are likewise each respectively occupied with four ordinal numbers. This procedure is then repeated twice. Another, two-time processing of the four groups of four quadrant groups of the third order ensues, whereby a different ordinal number is allocated to each of these quadrants.

The assigning of the ordinal numbers ensues into a random element and not into the element lying opposite when the quadrants are composed of only one element.

Only two ordinal numbers per quadrant are assigned when the quadrant of the last order is reached.

The dimensions of the threshold hill are selected such that the height thereof is a power of two and the width thereof is a multiple of the height and such that the threshold hill is filled with a plurality of quadratic basic shapes.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 17 depicts allocation of an ordinal number to quadrants by two-time processing of the total of four groups of four quadrant groups; and FIG. 18 depicts threshold hill that proceeded from the combination of both versions.

DESCRIPTION OF THE PREFERRED EMBODIMENT

The method of the present invention serves the purpose of minimizing periodic structures in the recording surface and of minimizing structures within the threshold hill.

1. Minimization of Periodic Structures

For minimizing periodic structures, it can first be observed that fainter structures become visible when the threshold hill is selected to have a larger expanse, for example 256×256 thresholds instead of 128×128, since the repetition period is then larger. Theoretically, the problem could be resolved in that the threshold hill is selected so large that the repetition period is no longer noticed. In practical terms, limits are quickly encountered since the need for memory space quadratically increases. Practical trials have shown that many megabyte memories would be required. In addition to the costs and the availability of existing devices, considerable disadvantages resulting the manipulation of such large data sets (loading times from a hard disk, etc.).

This problem can then be avoided without a substantial increase in the memory requirements. The goal is to achieve a repetition period with reasonable memory outlay such that no structures are visible to the eye in regions of smooth tonal values or at least are decisively alleviated. In order to achieve this, the threshold memory is inventively dimensioned substantially longer in one direction (for example, the x-direction) than in the other direction. For example, the dimension of the rectangular threshold matrix could be selected as 4096×16 thresholds instead of 256×256. The repetition period has thus substantially grown in the x-direction. However, it has become noticeably smaller in the y-direction.

In order to compensate this, the threshold matrix continues to be allocated in periodically repeating bits of the bit map 5 in the x-direction. In the y-direction, by contrast, the periodic allocation is overlaid with an offset. This offset can either be a random number that is repeatedly redefined, whereby an infinite repetition period would derive in the y-direction, or a fixed offset value whose selection must be undertaken such that an adequate repetition period is achieved.

Figures 1, 2:
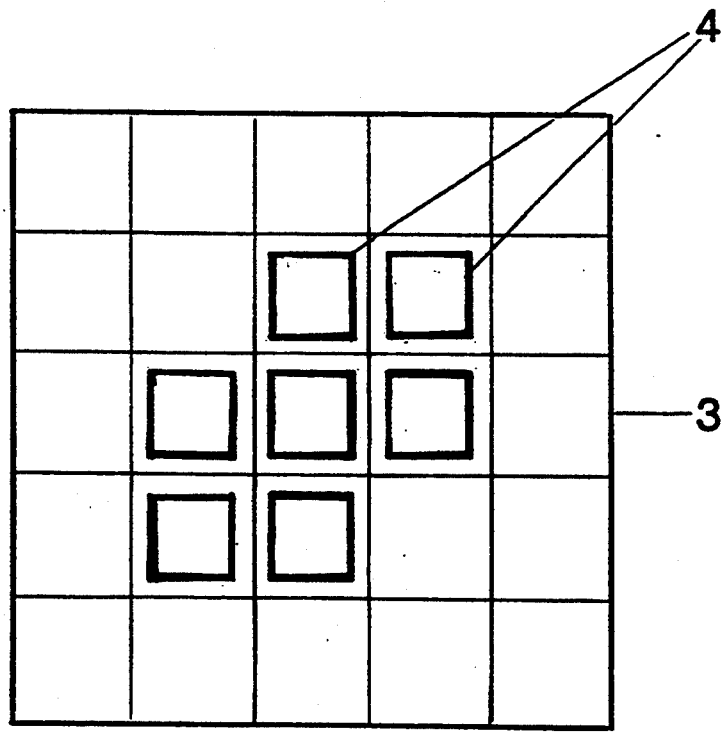
FIG. 1 depicts an example of a threshold hill for autotype rastering (prior art)
FIG. 2 depicts an example of an autotype pixel given approximately 25% surface coverage (prior art)
Figure 3:
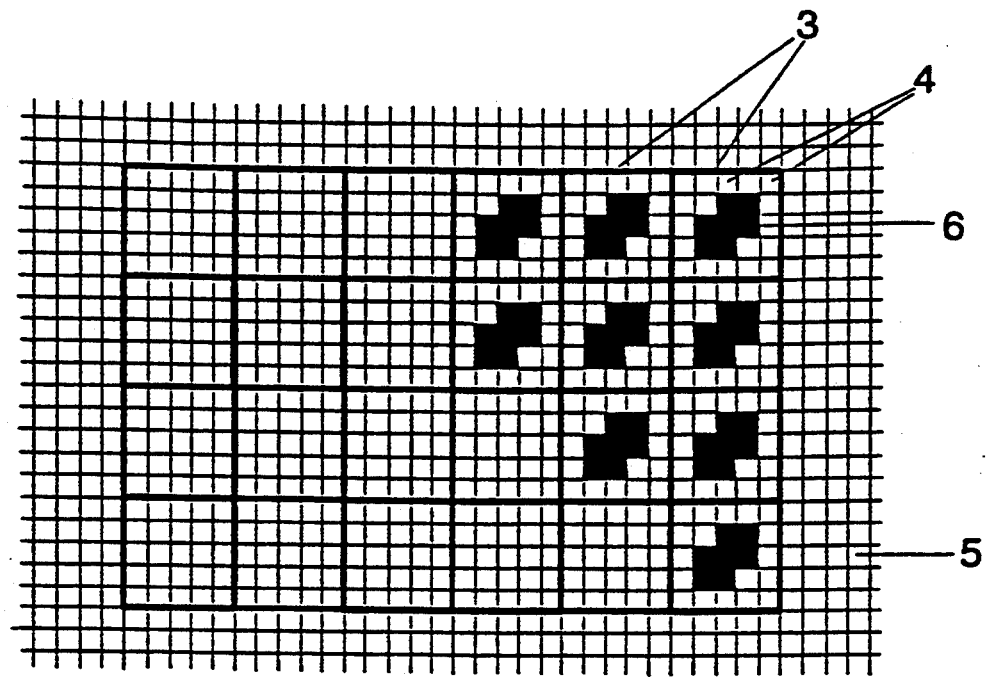
FIG. 3 depicts the periodic allocation of an autotype threshold hill to the bit map, whereby some pixels having approximately 25% surface coverage are indicated (prior art)
Figure 4:
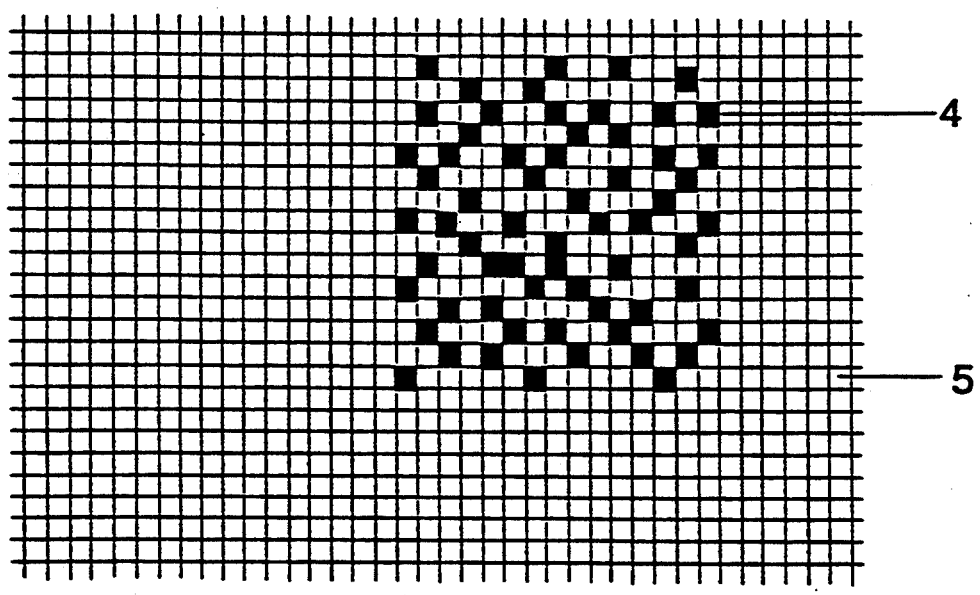
FIG. 4 depicts an example of frequency-modulated rastering, whereby a 25% surface coverage is indicated (prior art)
Figures 5, 6:
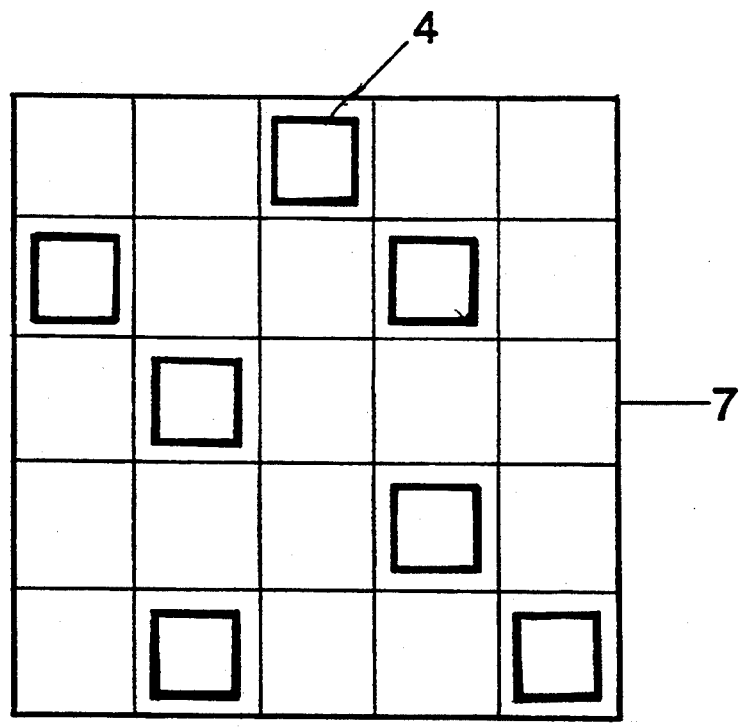
FIG. 5 depicts an example of a threshold hill for frequency-modulated rastering (prior art)
FIG. 6 depicts an example of a frequency-modulated pixel having approximately 25% surface coverage (prior art)
Figure 7:
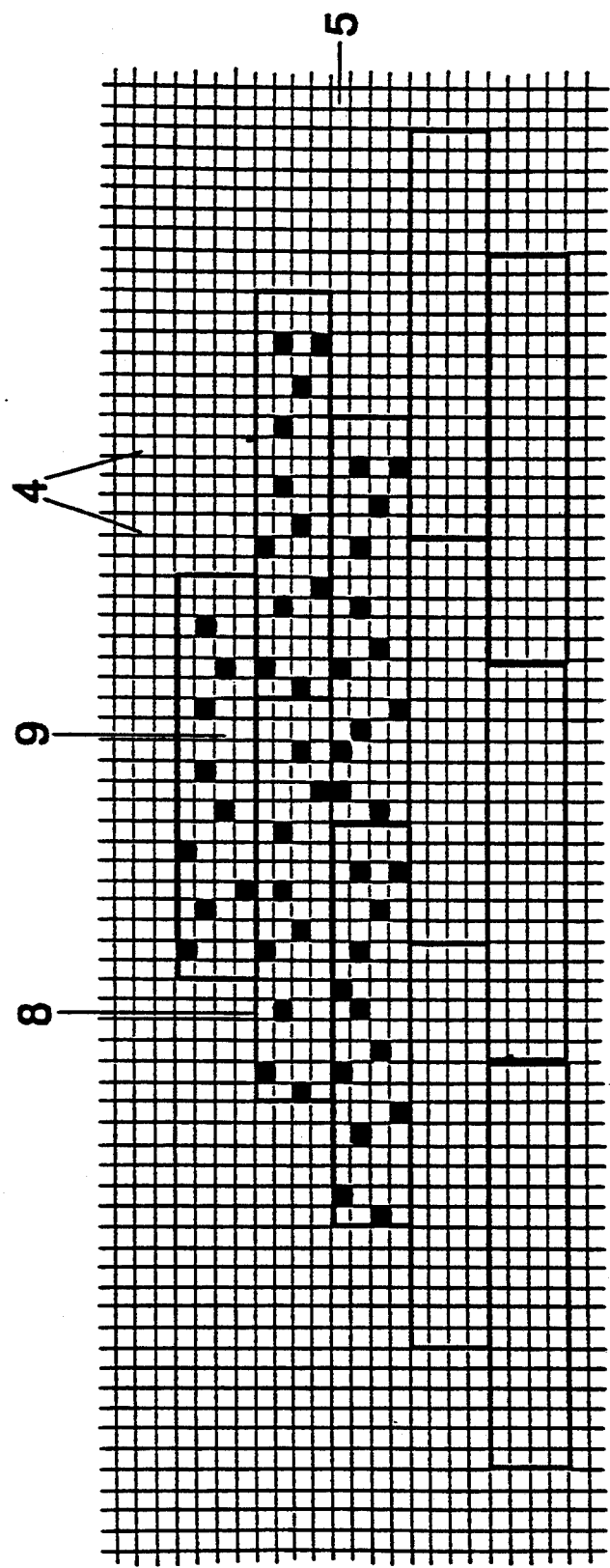
FIG. 7 depicts an example of a threshold hill having improved repetition period due to a fixed offset value wherein a 13% frequency-modulated tonal value is indicated.

FIG. 7 shows an example of a bit map 5 having an improved repetition period due to a fixed offset 8 of the threshold matrix within the bit map 5. The device pixels 4 within the individual, rectangular bit map regions 9 indicate a 13% frequency-modulated tonal value.

Figure 8:
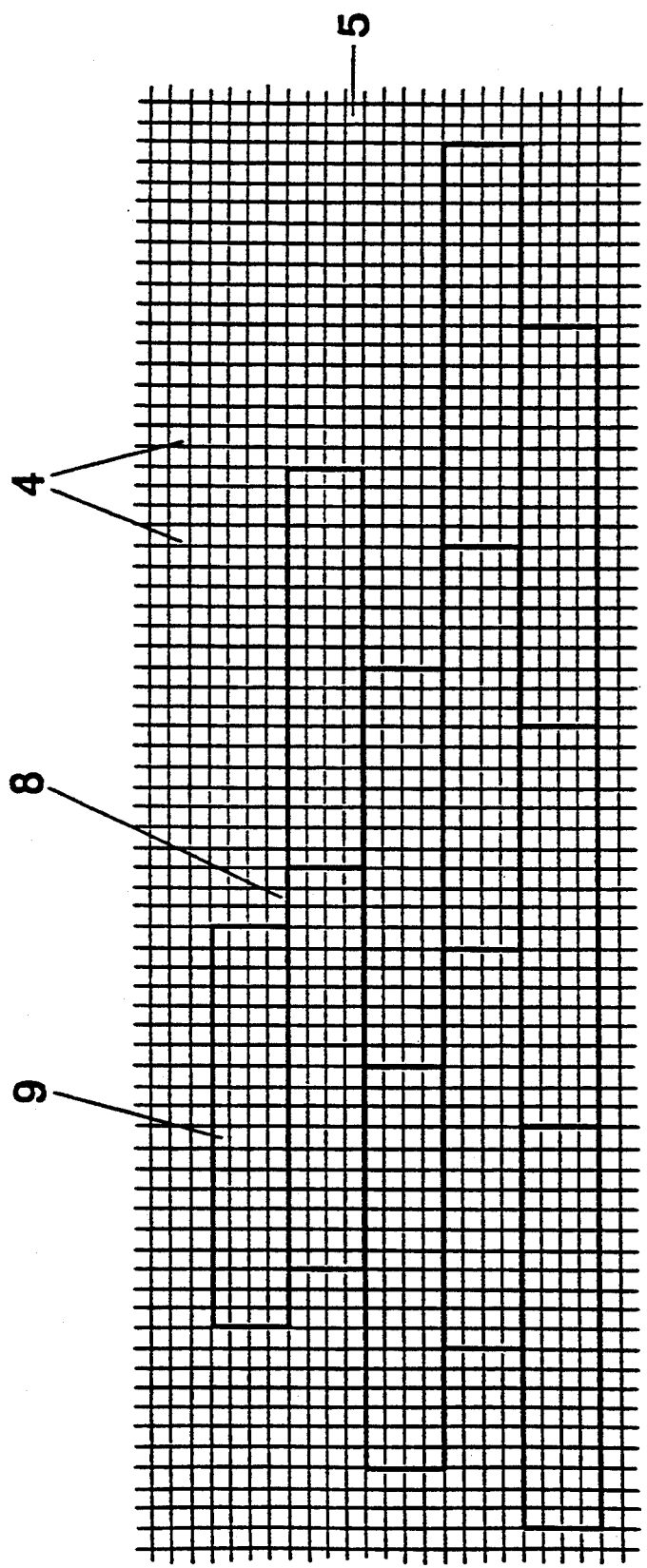
FIG. 8 depicts an example of a frequency-modulated threshold hill having improved repetition period due to random offset values.

FIG. 8 shows an example of a bit map 5 wherein the respective offset 8 of the threshold matrix or of the bit map regions 9 is randomly selected.

Particularly when using a fixed offset value, it is not necessary to use threshold matrices or threshold hills having a rectangular basic shape. As long as these can be seamlessly joined to one another, any desired shape can be selected, for example L-shaped threshold matrices or threshold hills.

Figure 9:
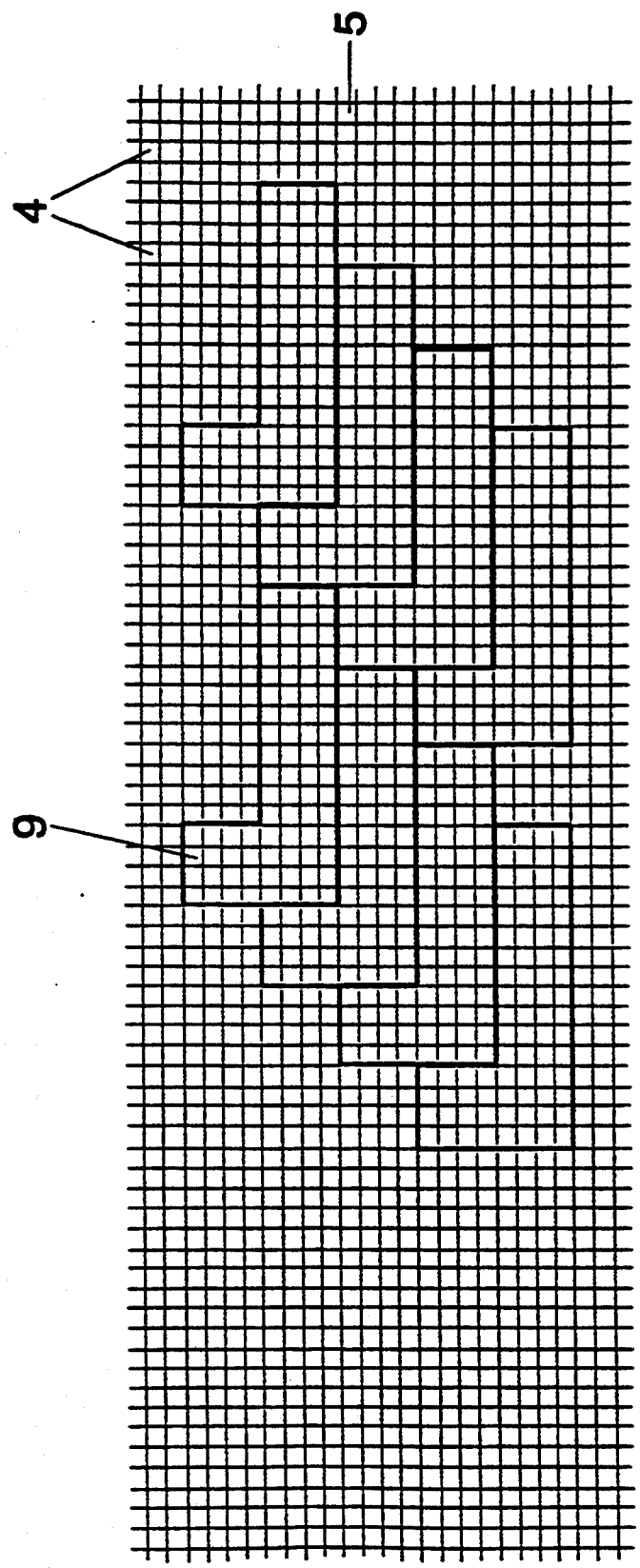
FIG. 9 depicts an example of a frequency-modulated threshold hill having improved repetition period upon employment of a non-rectangular basic shape.

FIG. 9 shows another example of frequency-modulated rastering with improved repetition using a non-rectangular basic shape of the threshold matrix. In continuation of this idea, a plurality of sub-hills can be used that can in turn be correspondingly joined.

Figure 10:
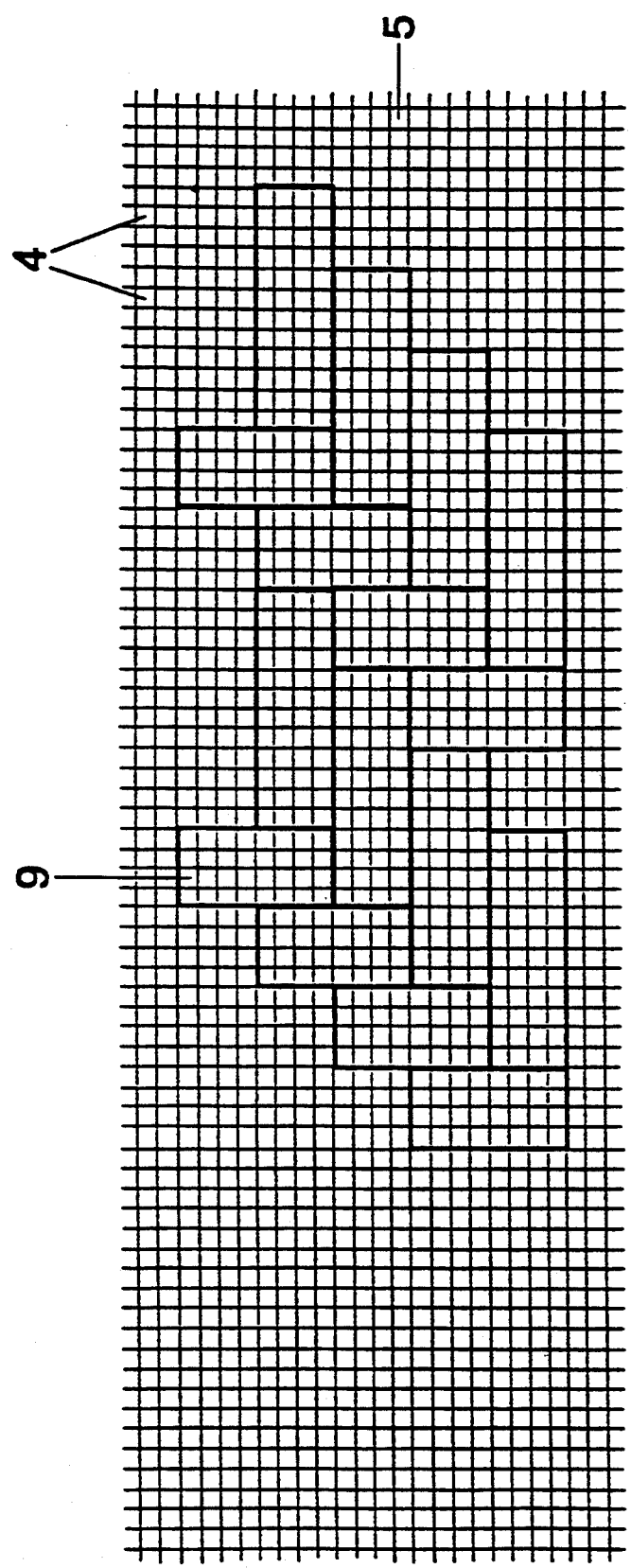
FIG. 10 depicts an example of a frequency-modulated threshold hill having improved repetition period upon employment of a plurality of sub-threshold hills.

FIG. 10 shows an example of a frequency-modulated rastering with improved repetition using a plurality of sub-threshold hills.

2. Minimization of the Structures within the Threshold Hill

The simplest way of generating the thresholds of the threshold hill for a frequency-modulated rastering would be to cast the sequence of the lending of the thresholds with a random number generator. Unfortunately, this method does not produce good results since the uniformity of chance leaves much to be desired. This leads to the fact that some of the thresholds clump up in a small area given certain tonal values. This leads to visible structures. The method set forth below decisively alleviates this disadvantage.

For the sake of simplicity, let a quadratic threshold hill first be assumed whose width and height may be assumed to be a power of two. If the finding set forth above continues to be maintained, to wit that thresholds between 1 and 255 are used, then, dependent on the size of the threshold hill, all thresholds do not occur or thresholds are doubly assigned. The goal of the method set forth here is to define the sequence of the thresholds to be assigned, not the thresholds themselves.

The purpose of the method is to in fact achieve a random distribution by continuous "squaring" or quadranting of the threshold hill and by random determination of the elements in the sub-quadrants, and to achieve an approximately equal distribution of the blackened device pixels over the entire surface. The procedure in the formation and selection of the sub-quadrants is based on the method which has become known as "ordered dither".

Figure 11:
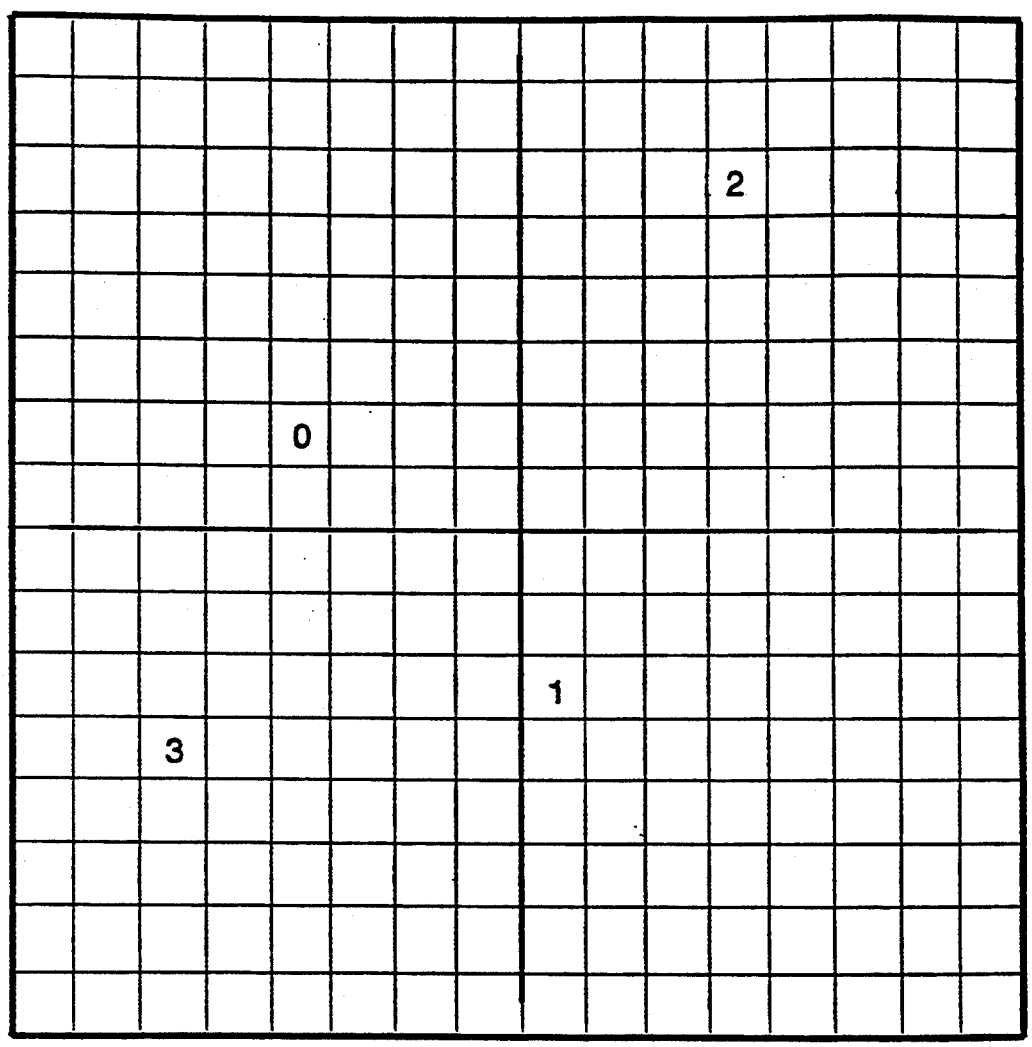
FIG. 11 depicts allocation of the number zero to an element from the threshold hill that is defined with a random generator.

FIG. 11 shows how an element from the threshold hill is defined by the random number generator for the first element of this row or series and the number zero is allocated to it. Subsequently, the hill is subdivided into four quadrants ("squaring") of the first order and the second element of the row or series is defined by the random generator in the quadrant which lies opposite the quadrant wherein the first element is located and the ordinal number one is allocated to it. Subsequently, the procedure is carried out in the same manner in the two remaining quadrants.

Figure 12:
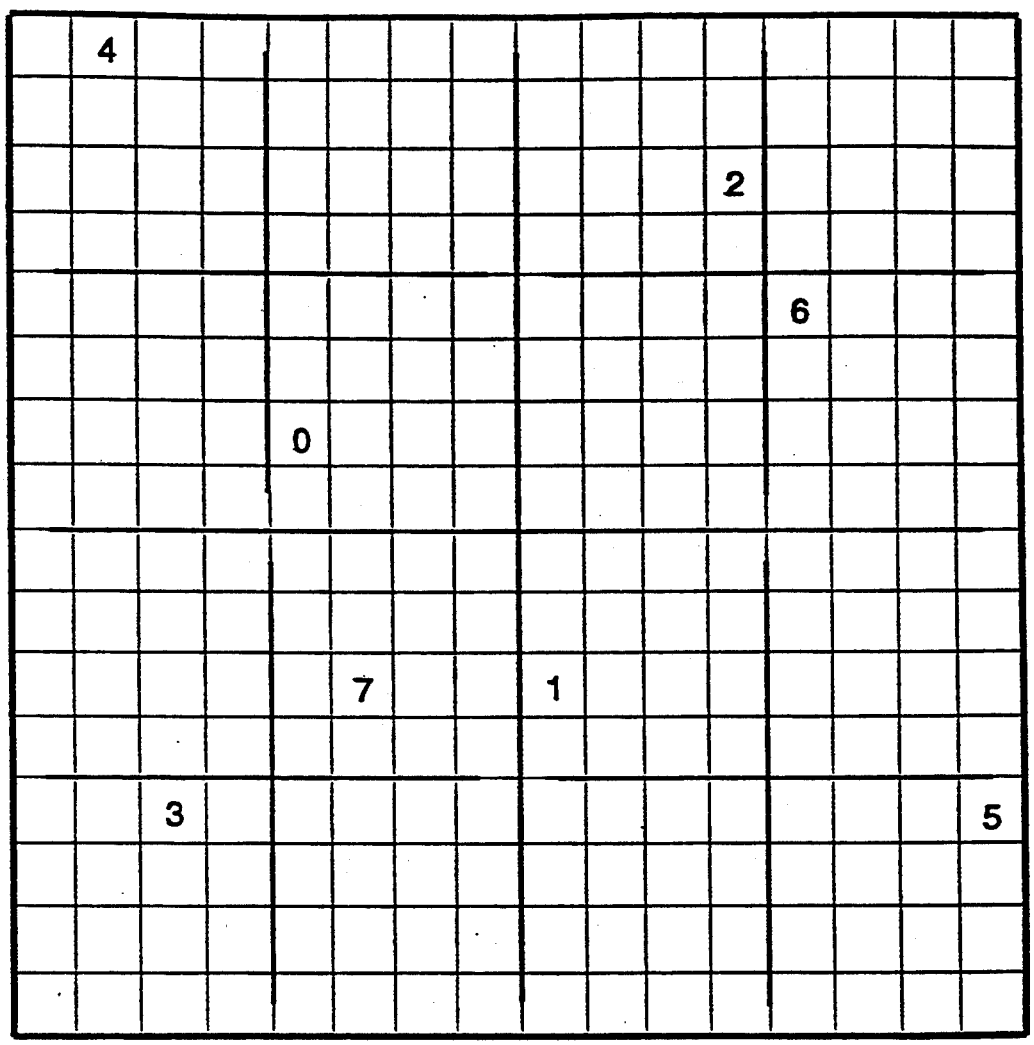
FIG. 12 depicts subdivision of four quadrants of the first order into four groups of four quadrants of the second order.

Next, the four quadrants of the first order are subdivided into four groups of four quadrants of the second order, as shown in FIG. 12. The four ordinal numbers assigned up to that point thus fall into one respective quadrant of the second order in order group.

In the next step, the ordinal numbers 4 through 7 are assigned. Again by random number generator, namely, one ordinal number is allocated to a respective quadrant of the second order from every group. The quadrant selected from each group for this purpose is that quadrant that lies diagonally opposite the quadrant that already contains an ordinal number. The purpose of the selection of the quadrants lying diagonally opposite one another is to achieve a higher equipartition and to avoid horizontal and vertical structures. The procedure is exactly the same in the quadrant groups, i.e. the ordinal number 4 is assigned in the upper left group, the next is assigned in the lower right group (lying diagonally opposite), then at the top right and, finally, at the bottom left, i.e. a crossed allocation ensues.

Figure 13:
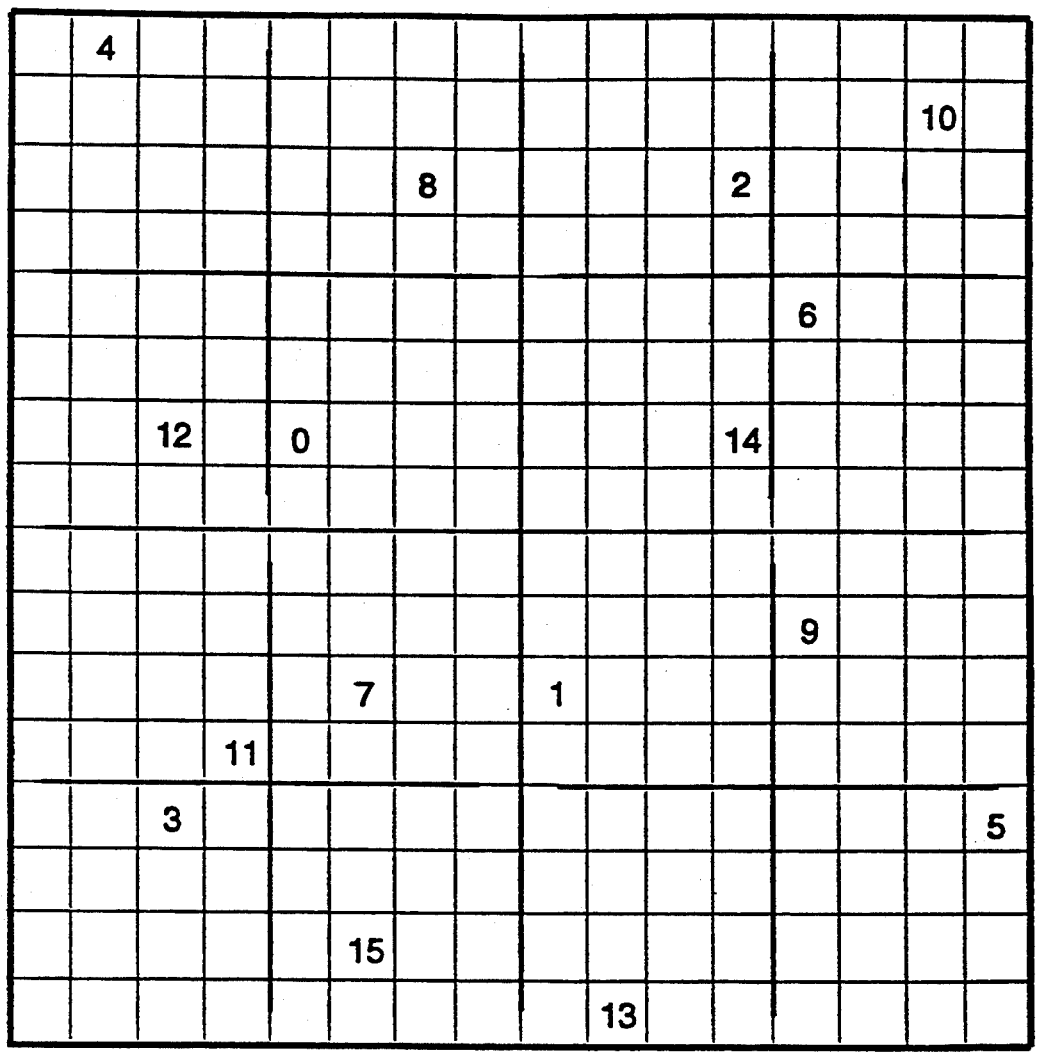
FIG. 13 depicts the respective occupation of a quadrant of each group with a further ordinal number.

So far, two respective quadrants of the second order from each group are occupied with a respective ordinal number. In two further passes, respectively one quadrant of each group is occupied with a further ordinal number, as shown in FIG. 13.

All quadrants of the second order have now been occupied with an ordinal number. Four groups of four quadrant groups of the third order are therefore now successively formed.

Figure 14:
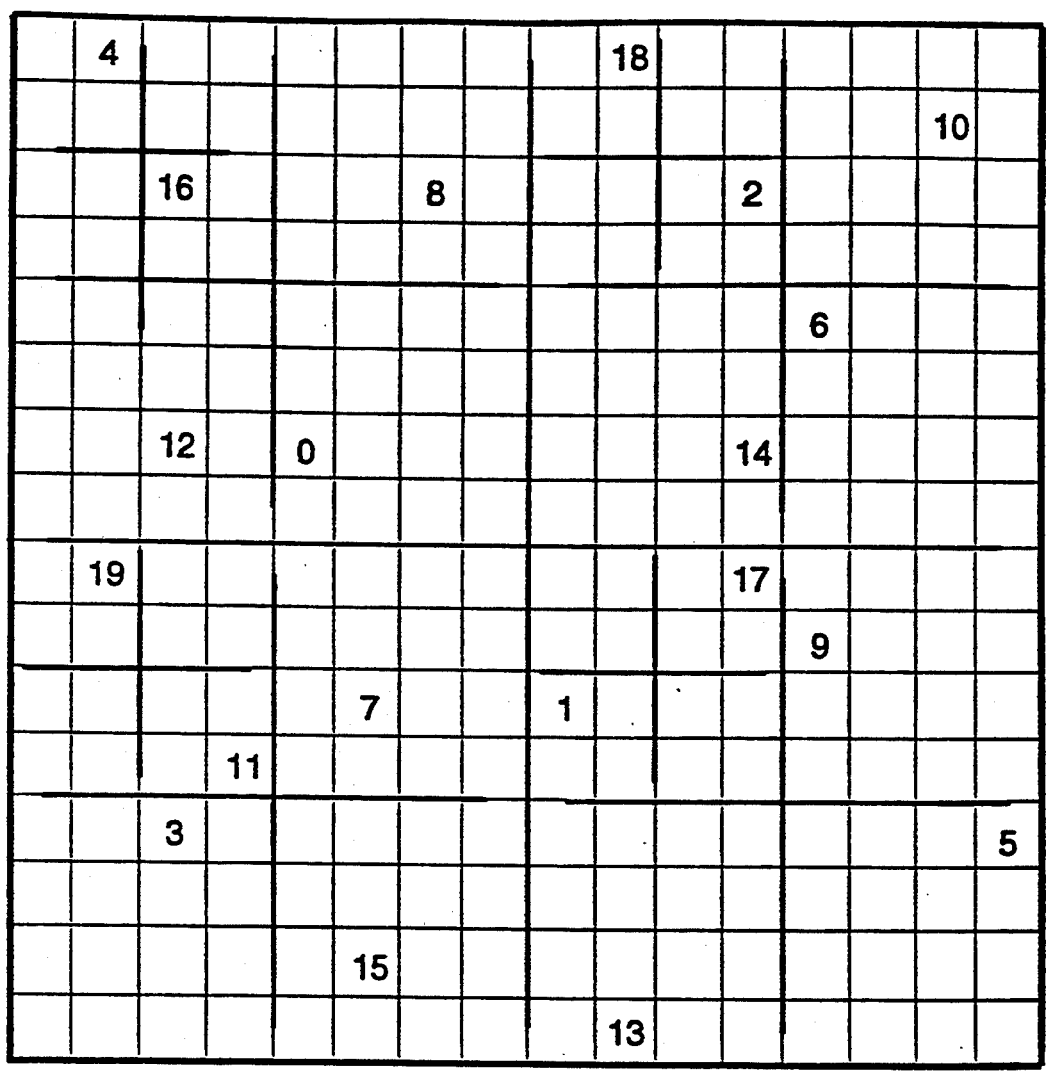
FIG. 14 depicts generation of a group of four quadrant groups.

First, a group of four quadrant groups is produced according to FIG. 14. The purpose of this arrangement is again a maximum equipartition. The assigning of the next four ordinal numbers in the individual quadrants of the third order of this group again ensues in the cross structure that has already been set forth.

Figure 15:
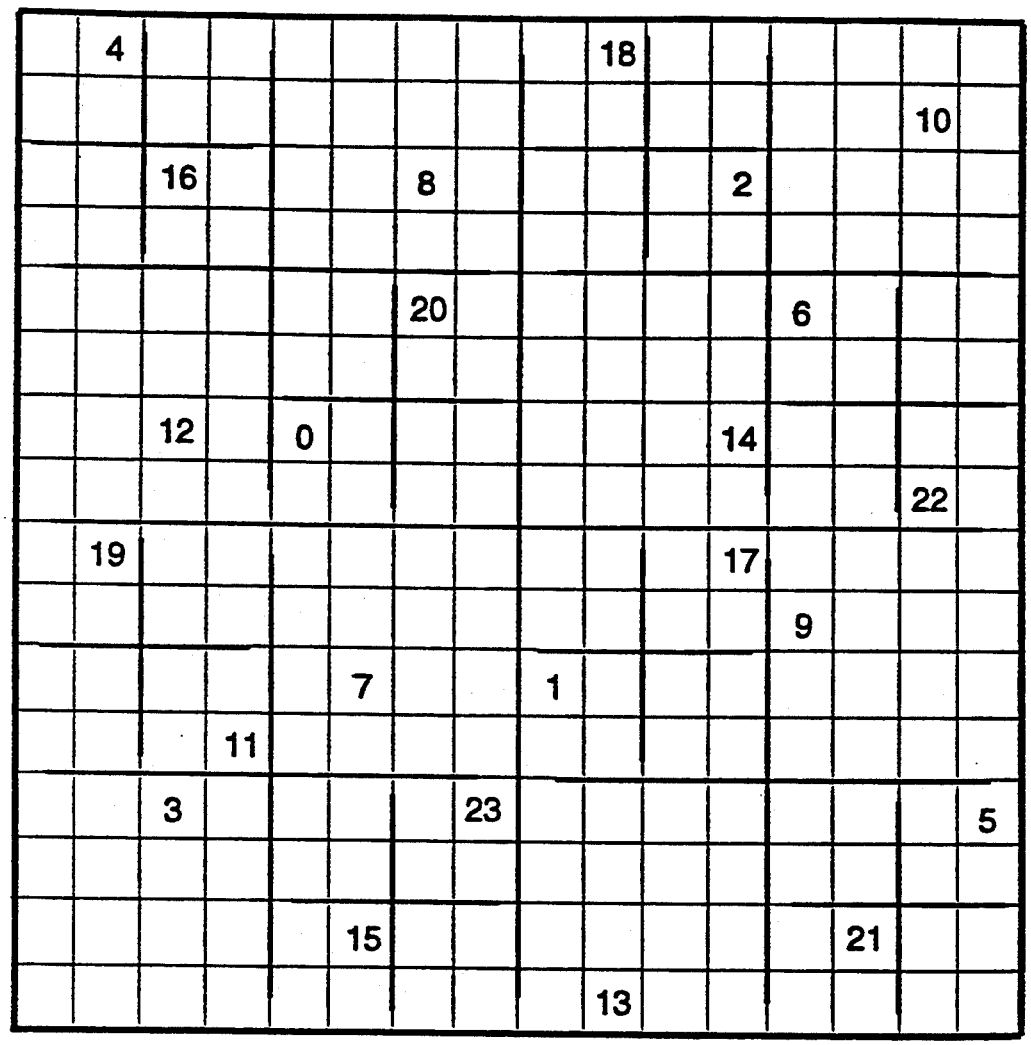
FIG. 15 depicts occupation of a further, diagonally offset group of four quadrant groups having four further ordinal numbers.

After this, a further, diagonally offset group of four quadrant groups is formed and is occupied with four further ordinal numbers, as FIG. 15 shows.

Figure 16:
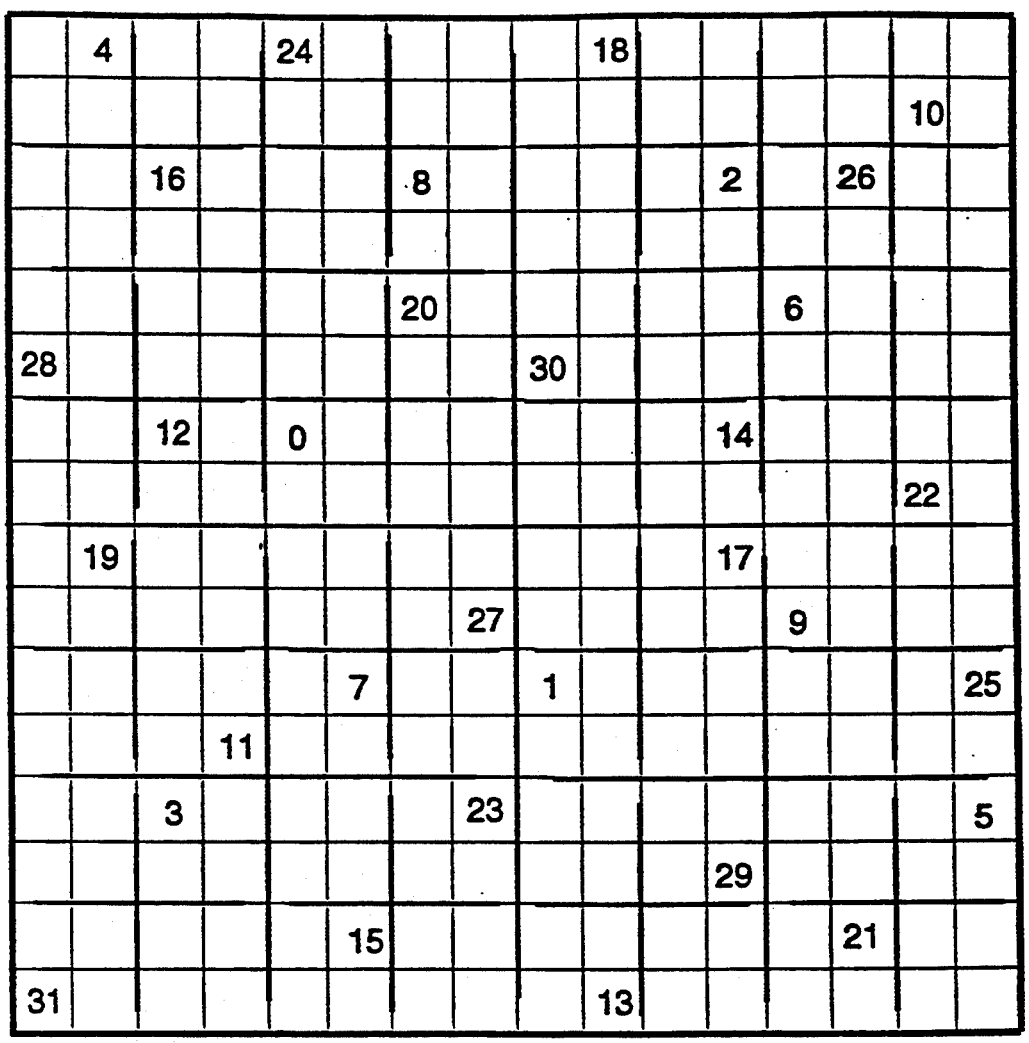
FIG. 16 depicts the two-time repetition of the occupation of a further, diagonally offset group of four quadrant groups having four further ordinal numbers.

This procedure is repeated twice more, as shown in FIG. 16.

FIG. 17 shows how two respective quadrants of a quadrant group of the third order are now occupied with ordinal numbers. By another, two-time processing of the total of four groups of four quadrant groups of the third order, an ordinal number is now assigned to each of these quadrants.

The procedure of quadrant formation is continued until a quadrant is composed of only one element and all elements of the threshold hill have ordinal numbers assigned to them. The actual thresholds are allocated after this.

At least two modifications of the above method are conceivable.

First, a pronounced checkerboard pattern of the device pixels very frequently results in the above method given a 50% tonal value. This is not always desirable. When the quadrants are composed of only one element, arbitrary quadrant from the group can be used instead of the quadrant lying diagonally opposite. This approach counteracts the checkerboard formation.

Second, it is more beneficial to divide the method in two for darker tonal values wherein there are optically white device pixels on a black background. For the quadrants of the last order, only two ordinal numbers per quadrant group are assigned, i.e. a total of only 50% of the elements are occupied. All device pixels are quasi placed a on a white background. Subsequently, the procedure of the continued quadranting is again repeated but begins with the highest number in the assigning of the ordinal numbers and assigns them in descending sequence. As a result, basically white is written on a black background and a better distribution is obtained in the dark tonal values.

FIG. 18 shows a complete threshold hill that has arisen from the combination of the two modifications set forth above.

The description for assigning the ordinal numbers has hitherto been limited to quadratic threshold hills. In order to also fill the threshold hill set forth in the first part, the dimensions thereof are selected such that the height thereof is a power of two and the width is a multiple of the height and fills them with a corresponding plurality of quadratic basic shapes produced according to the above method.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for optimizing frequency-modulated rasters for recording raster images, the image to be respectively recorded being optoelectronically scanned pixel-by-pixel and being digitally stored in a pixel memory in the form of gray scale values allocated to individual pixels, and threshold decisions being implemented on the basis of the gray scale values, a decision being made with reference to said threshold decisions as to whether or not a pixel is set in the recording of the image, comprising the steps of:
    a) providing a two-dimensional threshold memory for threshold decisions, superimposing the two-dimensional threshold memory on the pixel memory in two-dimensional periodic repetition for implementation of the threshold decisions and selecting thresholds such that the thresholds form a topography having at least one threshold hill within the threshold memory;
    b) selecting an expanse of the threshold memory such that the threshold memory is larger in one dimension than in the other dimension;
    c) providing an offset in one dimension of the repetition of the two-dimensional periodic repetition of the threshold memory;
    d) subdividing the threshold memory into sub-memories that together form the two-dimensional threshold memory;
    e) filling the sub-memories with thresholds by random selection of the thresholds of the threshold hill, by continuous quadranting of the thresholds, and by random distribution of the gray scale values within the sub-memories.

2. The method according to claim 1, wherein the offset is a constant offset.

3. The method according to claim 1, wherein the method further comprises varying the offset by a random number that is continually re-defined.

4. The method according to claim 1, wherein the method further comprises:
    a) fashioning the sub-memories as sub-quadrants that are formed of elements arranged in rows; and
    b) filling the elements of the sub-quadrants by continuous quadranting of the threshold hill and by random determination of the elements in the sub-quadrants.

5. The method according to claim 4, wherein the method further comprises:
   a) determining a first element of a row from the threshold hill with a random generator and allocating the number zero to the first element;
   b) subdividing the threshold hill into four quadrants of a first order, and determining a second element of the row in a quadrant of the first order which lies opposite a quadrant of the first order where the first element is located, and allocating the ordinal number one to said second element;
   c) assigning the ordinal numbers two and three in the remaining third and fourth quadrants of the first order, respectively, in the same manner as the ordinal numbers zero and one were assigned to the first and second quadrants of the first order;
   d) subdividing the four quadrants of the first order into four groups, each group having four quadrants, of the second order, whereby the four assigned ordinal numbers, zero, one, two, and three each respectively fall into a respective quadrant of the four quadrants of a first group of the four groups of the second order;
   e) respectively assigning the ordinal numbers four through seven to a second group of four quadrants within the quadrants of the second order, whereby a respective ordinal number of the ordinal numbers four through seven is assigned to that quadrant of the second group that lies opposite the quadrant of the second group that already contains a respective ordinal number of the ordinal numbers zero through three;
   f) in two further operations, respectively assigning to each remaining quadrant of third and fourth groups of the second order a different further ordinal number until all quadrants of the second order have respectively assigned ordinal numbers;
   g) successively forming four quadrant groups of the third order by subdividing the quadrants of the second order, wherein a first quadrant group of the four quadrant groups of the third order is formed first and four further ordinal numbers are assigned thereto, a second quadrant group of the four quadrant groups of the third order lying diagonally relative to the first group of the four quadrant groups of the third order is formed next, and is likewise assigned four different ordinal numbers, and, subsequently, a third quadrant group and a fourth quadrant group of the four quadrant groups are formed that are likewise each respectively assigned four unique ordinal numbers;
   h) repeating step g) until all quadrants of the third order have respectively assigned ordinal numbers;
   i) performing another two-time processing of the four groups of four quadrant groups of the third order, whereby a respective ordinal number is allocated to each quadrant of the third order.

6. The method according to claim 5, wherein the assigning of the ordinal numbers ensues into a random element and not into the element lying opposite when the respective quadrants are composed of only one element.

7. The method according to claim 5, wherein only two ordinal numbers per quadrant are assigned when the quadrant of a last order is reached.

8. The method according to claim 1, wherein dimensions of the threshold hill are selected such that a height thereof is a power of two and a width thereof is a multiple of the height, and wherein the threshold memory has at least one of a plurality of quadratic basic shapes.

9. A method for optimizing frequency-modulated rasters for recording raster images, the image to be respectively recorded being optoelectronically scanned pixel-by-pixel and being digitally stored in a pixel memory in the form of gray scale values allocated to individual pixels, and threshold decisions being implemented on the basis of the gray scale values, a decision being made with reference to said threshold decisions as to whether or not a pixel is set in the recording of the image, comprising the steps of:
   a) providing a two-dimensional threshold memory for threshold decisions, superimposing the two-dimensional threshold memory on the pixel memory in two-dimensional periodic repetition for implementation of the threshold decisions and selecting thresholds such that the thresholds form a topography having at least one threshold hill within the threshold memory;
   b) dimensioning the threshold hill such that a height thereof is a power of two and a width thereof is a multiple of the height;
   c) selecting an expanse of the threshold memory such that the threshold memory is larger in one dimension than in the other dimension and such that the threshold memory has one of a plurality of quadratic basic shapes;
   d) providing an offset in one dimension of the repetition of the two-dimensional periodic repetition of the threshold memory;
   e) subdividing the threshold memory into sub-memories that together form the two-dimensional threshold memory;
   f) filling the sub-memories with thresholds by random selection of the thresholds of the threshold hill, by continuous quadranting of the thresholds, and by random distribution of the gray scale values within the sub-memories.

10. The method according to claim 9, wherein the offset is a constant offset.

11. The method according to claim 9, wherein the method further comprises varying the offset by a random number that is continually re-defined.

12. The method according to claim 9, wherein the method further comprises:
   a) fashioning the sub-memories as sub-quadrants that are formed of elements arranged in rows; and
   b) filling the elements of the sub-quadrants by continuous quadranting of the threshold hill and by random determination of the elements in the sub-quadrants.

13. The method according to claim 12, wherein the method further comprises:
   a) determining a first element of a row from the threshold hill with a random generator and allocating the number zero to the first element;
   b) subdividing the threshold hill into four quadrants of a first order, and determining a second element of the row in a quadrant of the first order which lies opposite a quadrant of the first order where the first element is located, and allocating the ordinal number one to said second element;
   c) assigning the ordinal numbers two and three in the remaining third and fourth quadrants of the first order, respectively, in the same manner as the ordinal numbers zero and one were assigned to the first and second quadrants of the first order;

d) subdividing the four quadrants of the first order into four groups, each group having four quadrants, of the second order, whereby the four assigned ordinal numbers, zero, one, two, and three each respectively fall into a respective quadrant of the four quadrants of a first group of the four groups of the second order;

e) respectively assigning the ordinal numbers four through seven to a second group of four quadrants within the quadrants of the second order, whereby a respective ordinal number of the ordinal numbers four through seven is assigned to that quadrant of the second group that lies opposite the quadrant of the second group that already contains a respective ordinal number of the ordinal numbers zero through three;

f) in two further operations, respectively assigning to each remaining quadrant of third and fourth groups of the second order a different further ordinal number until all quadrants of the second order have respectively assigned ordinal numbers;

g) successively forming four quadrant groups of the third order by subdividing the quadrants of the second order, wherein a first quadrant group of the four quadrant groups of the third order is formed first and four further ordinal numbers are assigned thereto, a second quadrant group of the four quadrant groups of the third order lying diagonally relative to the first group of the four quadrant groups of the third order is formed next, and is likewise assigned four different ordinal numbers, and, subsequently, a third quadrant group and a fourth quadrant group of the four quadrant groups are formed that are likewise each respectively assigned four unique ordinal numbers;

h) repeating step g) until all quadrants of the third order have respectively assigned ordinal numbers;

i) performing another two-time processing of the four groups of four quadrant groups of the third order, whereby a respective ordinal number is allocated to each quadrant of the third order.

14. The method according to claim 13, wherein the assigning of the ordinal numbers ensues into a random element and not into the element lying opposite when the respective quadrants are composed of only one element.

15. The method according to claim 13, wherein only two ordinal numbers per quadrant are assigned when the quadrant of a last order is reached.

16. A method for optimizing frequency-modulated rasters for recording raster images, the image to be respectively recorded being optoelectronically scanned pixel-by-pixel and being digitally stored in a pixel memory in the form of gray scale values allocated to individual pixels, and threshold decisions being implemented on the basis of the gray scale values, a decision being made with reference to said threshold decisions as to whether or not a pixel is set in the recording of the image, comprising the steps of:

a) providing a two-dimensional threshold memory for threshold decisions, superimposing the two-dimensional threshold memory on the pixel memory in two-dimensional periodic repetition for implementation of the threshold decisions and selecting thresholds such that the thresholds form a topography having at least one threshold hill within the threshold memory;

b) selecting an expanse of the threshold memory such that the threshold memory is larger in one dimension than in the other dimension;

c) providing an offset in one dimension of the repetition of the two-dimensional periodic repetition of the threshold memory;

d) subdividing the threshold memory into sub-memories that are formed of elements in a row and that together form the two-dimensional threshold memory;

e) determining a first element of a row from the threshold hill with a random generator and allocating the number zero to the first element;

f) subdividing the threshold hill into four quadrants of a first order, and determining a second element of the row in that a quadrant of the first order which lies opposite a the quadrant of the first order where the first element is located, and allocating the ordinal number one to said second element;

g) assigning the ordinal numbers two and three in the remaining third and fourth quadrants of the first order, in the same manner as the ordinal numbers zero and one are first and second quadrants of the first order;

h) subdividing the four quadrants of the first order into four groups, each group having four quadrants, of the second order, whereby the four assigned ordinal numbers, zero, one, two, and three each respectively fall into a respective quadrant of the four quadrants of a respective one of the four groups of the second order;

i) respectively assigning the ordinal numbers four through seven to the groups of four quadrants within the quadrants of the second order, whereby a respective ordinal number of the ordinal numbers four through seven is assigned to that quadrant of a respective group that lies opposite the quadrant of the respective group that already contains a respective ordinal number of the ordinal numbers zero through three;

j) in two further operations, respectively assigning to each remaining quadrant of each group of the second order a different further ordinal number until all quadrants of the second order have respectively assigned ordinal numbers;

k) successively forming four groups of quadrants of the third order for a respective group of the second order, wherein a first group of the four groups of the third order is formed first and four further ordinal numbers are assigned thereto, a second group of the four groups of the third order lying diagonally relative to the first group of the third order is formed next, and is likewise assigned four different ordinal numbers, and, subsequently, a third group and a fourth group are formed that are likewise each respectively assigned four unique ordinal numbers;

l) repeating step k) for each of the remaining groups of the four groups of the third order until all quadrants of the third order have respectively assigned ordinal numbers;

m) performing another, two-time processing of the four groups of four quadrant groups of the third order, whereby a respective ordinal number is allocated to each quadrant of the third order; and n) allocating respective thresholds to respective ordinal numbers.

17. The method according to claim 16, wherein the assigning of the ordinal numbers ensues into a random element and not into the element lying opposite when the respective quadrants are composed of only one element.

18. The method according to claim 16, wherein only two ordinal numbers per quadrant are assigned when the quadrant of a last order is reached.

19. The method according to claim 16, wherein dimensions of the threshold hill are selected such that a height thereof is a power of two and a width thereof is a multiple of the height and wherein the threshold memory has at least one of a plurality of quadratic basic shapes.

20. The method according to claim 16, wherein the offset is a constant offset.

* * * * *